(12) United States Patent
Kimba Dit Adamou (10) Patent No.: US 11,582,655 B2
(45) Date of Patent: Feb. 14, 2023

(54) CONDITION HANDOVER CANCELLATION METHOD AND COMMUNICATION EQUIPMENT

(71) Applicant: VIVO MOBILE COMMUNICATION CO., LTD., Guangdong (CN)

(72) Inventor: Boubacar Kimba Dit Adamou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 172 days.

(21) Appl. No.: 16/969,601

(22) PCT Filed: Jan. 28, 2019

(86) PCT No.: PCT/CN2019/073397
§ 371 (c)(1),
(2) Date: Aug. 13, 2020

(87) PCT Pub. No.: WO2019/157938
PCT Pub. Date: Aug. 22, 2019

(65) Prior Publication Data
US 2021/0058836 A1 Feb. 25, 2021

(30) Foreign Application Priority Data
Feb. 13, 2018 (CN) .......................... 201810151031.5

(51) Int. Cl.
*H04W 36/00* (2009.01)

(52) U.S. Cl.
CPC ............... *H04W 36/0079* (2018.08); *H04W 36/0016* (2013.01); *H04W 36/0058* (2018.08); *H04W 36/00837* (2018.08)

(58) Field of Classification Search
CPC ......... H04W 36/0079; H04W 36/0058; H04W 36/00837; H04W 36/36; H04W 36/0005; H04W 36/0016; H04W 36/08
See application file for complete search history.

(56) References Cited

U.S. PATENT DOCUMENTS

| 2009/0296660 A1 | 12/2009 | Weng |
| 2014/0126545 A1 | 5/2014 | Tamura et al. |
| 2017/0026960 A1 | 1/2017 | Mestanov et al. |
| 2020/0022042 A1* | 1/2020 | Yin ................. H04W 36/00837 |

(Continued)

FOREIGN PATENT DOCUMENTS

| CN | 101505514 A | 8/2009 |
| CN | 103546978 A | 1/2014 |

(Continued)

OTHER PUBLICATIONS

First Office Action dated Apr. 24, 2020 issued in 201810151031.5.
Second Office Action dated Jan. 22, 2021 issued in 201810151031.5.

(Continued)

*Primary Examiner* — Nam T Huynh
(74) *Attorney, Agent, or Firm* — Brooks Kushman P.C.

(57) ABSTRACT

A condition handover cancellation method and a communication equipment are provided. A CHO cancellation method applied to a source network side device includes: sending a CHO request to at least one target network side device; and sending a CHO cancellation message to the target network side device and/or a terminal side device.

13 Claims, 4 Drawing Sheets

```
┌─────────────────────────────────────┐
│ sending a CHO request to at least   │ ─── 101
│ one target network side device      │
└─────────────────────────────────────┘
                 │
                 ▼
┌─────────────────────────────────────┐
│ sending a CHO cancellation message  │ ─── 102
│ to the target network side device and/│
│ or a terminal side device           │
└─────────────────────────────────────┘
```

(56) References Cited

U.S. PATENT DOCUMENTS

2020/0022055 A1* 1/2020 Yan ..................... H04W 36/36
2020/0045602 A1   2/2020 Jiang
2020/0059847 A1   2/2020 Lin et al.

FOREIGN PATENT DOCUMENTS

| CN | 105228200 A  | 1/2016  |
|----|--------------|---------|
| CN | 107113673 A  | 8/2017  |
| CN | 108810960 A  | 11/2018 |
| EP | 3569012 A1   | 11/2019 |
| EP | 3609231 A1   | 2/2020  |
| WO | 2013024574 A1| 2/2013  |
| WO | 2018132051 A1| 7/2018  |

OTHER PUBLICATIONS

GPP TSG-RAN WG2 #97, Athens, Greece, Jan. 13-17, 2017, Agenda Item: 10.3.1.1.2, Tdoc R2-1700864 (Update of R2-1700544), "Conditional Handover", 5 pages.
3GPP TSG-RAN WG3 Meeting#61bis, x R3-082685, Prague, Czech, Sep. 30-Oct. 3, 2008, "Handover Cancellation", 5 pages.
Written Opinion/International Search Report dated Aug. 27, 2020 issued in PCT/CN2019/073397.
Extended European Search Report dated Mar. 9, 2021 issued in PCT/CN2019/073397.
3GPP TSG-RAN WG2 #97bis; R2-1713856; Spokane, USA, Apr. 3-7, 2017; "Analysis on conditional handover"; 7 pages.
3GPP TSG-RAN WG2 #97bis; R2-1703384; Spokane, USA, Apr. 3-7, 2017; "Analysis on conditional handover"; 7 pages.
First Office Action dated Jan. 22, 2020 issued in 201810151031.5.

\* cited by examiner

CONDITION HANDOVER CANCELLATION METHOD AND COMMUNICATION EQUIPMENT

CROSS REFERENCE OF RELATED APPLICATION

The present application is the U.S. national phase of PCT Application PCT/CN2019/073397 filed on Jan. 28, 2019, which claims a priority of Chinese patent application No. 201810151031.5 filed on Feb. 13, 2018, which are incorporated herein by reference in their entirety.

TECHNICAL FIELD

The present disclosure relates to the field of communications technology, in particular to a condition handover cancellation method and a communication equipment.

BACKGROUND

Figure 1:
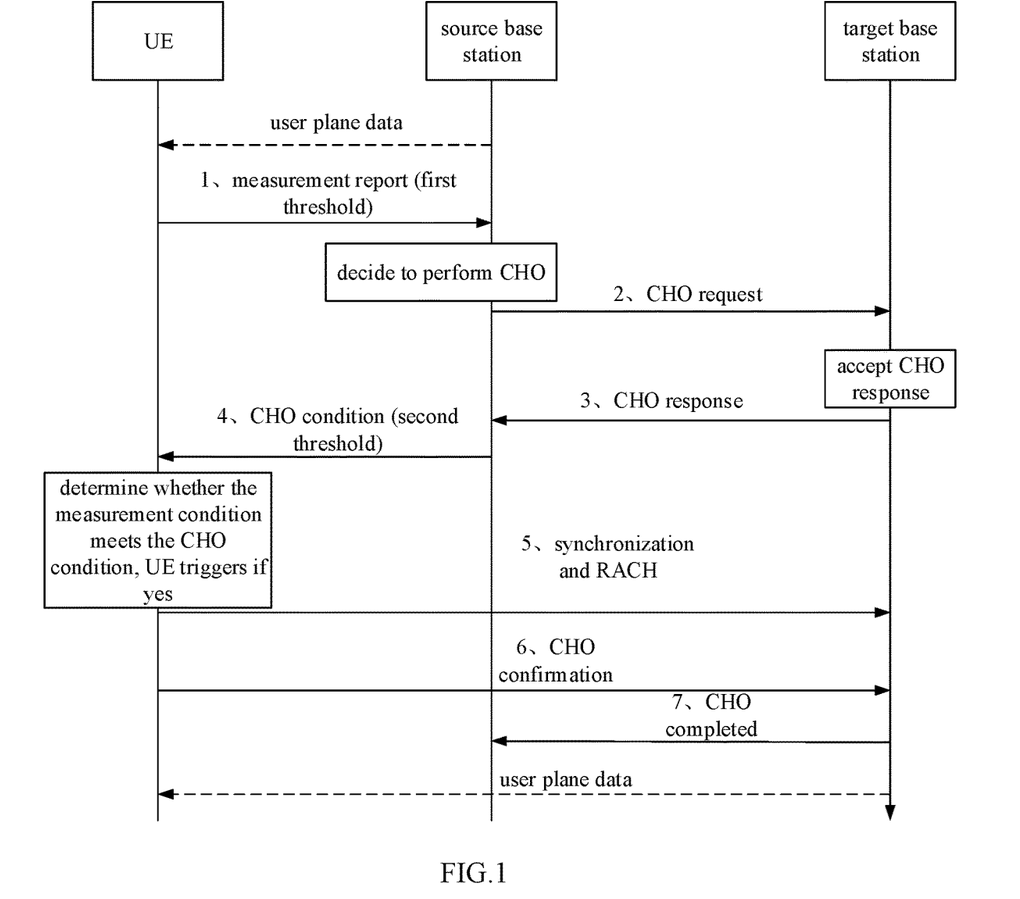
FIG. 1 is a flow chart of a CHO in the prior art.

In a condition handover (condition handover, CHO) scenario of the $5^{th}$ generation mobile communication technology (5th-Generation, 5G) system, as shown in FIG. 1, a source base station can report a CHO request to a target base station according to a measurement report of a user equipment (User Equipment, UE), and the target base station will feed back a confirmation for the CHO request. After the source base station receives the CHO response, the source base station can send a CHO command to the UE. The CHO command includes the conditions under which the UE can perform a CHO to the target base station. If the UE determines that the measurement conditions meet the CHO condition, the CHO is triggered, synchronization and random access channel (Random Access Channel, RACH) messages are sent to the target base station, and a CHO confirmation message is sent to the target base station. The target base station sends a CHO completion message to the source base station, then the CHO is completed.

However, the prior art has not yet specified how to cancel the CHO after the source base station initiates the CHO request.

SUMMARY

The technical issue to be solved by the present disclosure is to provide a condition handover cancellation method and a communication device, so as to cancel the CHO after the source network side device sends the CHO request to the target network side device.

To solve the above technical issue, the embodiments of the present disclosure provide technical solutions as follows.

In a first aspect, a CHO cancellation method applied to a source network side device is provided in an embodiment of the present disclosure, including:

sending a CHO request to at least one target network side device; and sending a CHO cancellation message to the target network side device and/or a terminal side device.

In a second aspect, a CHO cancellation method applied to a target network side device is provided in an embodiment of the present disclosure, including:

receiving a CHO request sent by a source network side device; and sending a CHO cancellation message to the source network side device before a CHO occurs.

In a third aspect, a CHO cancellation method applied to a terminal side device is provided in an embodiment of the present disclosure, including:

receiving a CHO cancellation message sent by a source network side device, prior to performing a CHO to a target network side device.

In a fourth aspect, a network side device is provided in an embodiment of the present disclosure, including:

a transceiving module, configured to send a CHO request to at least one target network side device and send a CHO cancellation message to the target network side device and/or a terminal side device.

In a fifth aspect, a network side device is provided in an embodiment of the present disclosure, including:

a transceiving module, configured to: receive a CHO request sent by a source network side device; and send a CHO cancellation message to the source network side device before a CHO occurs.

In a sixth aspect, a terminal side device is provided in an embodiment of the present disclosure, including:

a receiving module, configured to: receive a CHO cancellation message sent by a source network side device, prior to performing a CHO to a target network side device.

In a seventh aspect, a communication device is provided in an embodiment of the present disclosure, including: a memory, a processor and a computer program stored in the memory and executable on the processor, where the processor executes the computer program to perform the CHO cancellation method hereinabove.

In an eighth aspect, a computer-readable storage medium is provided in an embodiment of the present disclosure, where a computer program is stored in the computer-readable storage medium, and a processor executes the computer program to perform the CHO cancellation method hereinabove.

The embodiments of the present disclosure has the following advantageous effects.

According to the embodiments of the present disclosure, after a source network side device sends a CHO request to at least one target network side device, the source network side device or the target network side device may, according to actual situations, initiate a CHO cancellation, so as to cancel a condition handover of a terminal side device.

DETAILED DESCRIPTION

The technical solutions in the embodiments of the present disclosure will be described clearly and completely in conjunction with the drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the scope of the present disclosure.

A condition handover cancellation method and a communication device are provided in the embodiments of the present disclosure, so as to cancel the CHO after the source network side device sends the CHO request to the target network side device.

Figure 2:
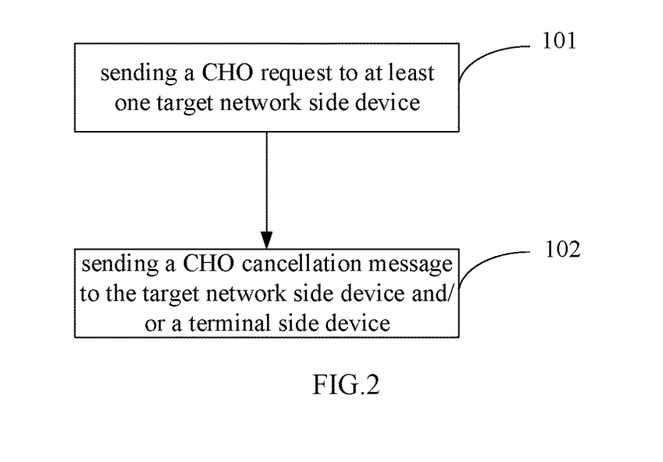
FIG. 2 is a flowchart of a CHO cancellation method applied to a source network side device in an embodiment of the present disclosure.

A CHO cancellation method is provided in an embodiment of the present disclosure, applied to a source network side device, i.e., a network side device that initiates a CHO request. As shown in FIG. 2, the method includes:

Step 101: sending a CHO request to at least one target network side device;

Step 102: sending a CHO cancellation message to the target network side device and/or a terminal side device.

According to the embodiments of the present disclosure, after a source network side device sends a CHO request to at least one target network side device, the source network side device may, according to actual situations, initiate a CHO cancellation, so as to cancel a condition handover of a terminal side device.

For example, the sending the CHO cancellation message to the target network side device and/or the terminal side device includes:

sending the CHO cancellation message to the target network side device in the case that a CHO response returned by the target network side device is not received within a preset time.

For example, the sending the CHO cancellation message to the target network side device and/or the terminal side device includes:

receiving a CHO response returned by the target network side device;

sending the CHO cancellation message to the target network side device, before a CHO command is not sent to the terminal side device;

sending the CHO cancellation message to the target network side device and the terminal side device, in the case that the CHO command is sent to the terminal side device.

Furthermore, prior to the sending the CHO cancellation message, the method further includes:

determining that the target network side device does not satisfy a CHO condition, according to a measurement report reported by the terminal side device.

Furthermore, the CHO cancellation message sent to the target network side device includes at least one of:

a CHO cancellation reason;

information of a network side device that needs to cancel a CHO;

the CHO cancellation message sent to the terminal side device includes the information of the network side device that needs to cancel the CHO.

For example, the sending the CHO cancellation message to the target network side device and/or the terminal side device includes:

receiving a CHO response returned by a first target network side device;

receiving a terminal side device CHO success message returned by a second target network side device, where the terminal side device CHO success message indicates that the terminal side device successfully performs a CHO to the second target network side device; and sending the CHO cancellation message to the first target network side device, where the first target network side device and the second target network side device are different target network side devices.

Furthermore, the terminal side device CHO success message further includes at least one of:

information of a cell accessed by the terminal side device;

information of a network side device accessed by the terminal side device;

the CHO cancellation message includes a CHO cancellation reason.

Furthermore, prior to the sending the CHO cancellation message to the target network side device and/or the terminal side device, the method further includes:

receiving the CHO cancellation message sent by the target network side device.

Furthermore, the sending the CHO cancellation message to the target network side device and/or the terminal side device includes:

sending the CHO cancellation message to the terminal side device.

Furthermore, the CHO cancellation method further includes:

sending a CHO cancellation confirmation to the target network side device.

Furthermore, the CHO cancellation message includes information for identifying a CHO command.

Figure 3:
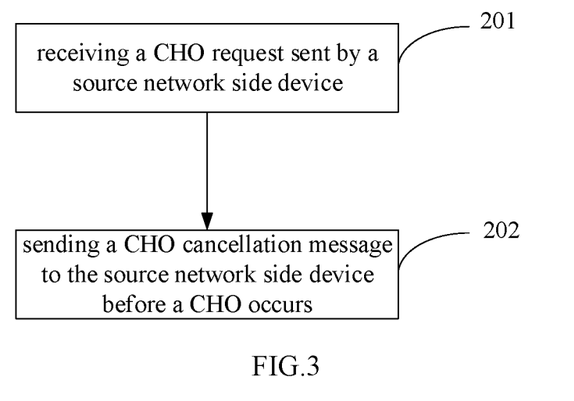
FIG. 3 is a flowchart of a CHO cancellation method applied to a target network side device in an embodiment of the present disclosure.

A CHO cancellation method is provided in an embodiment of the present disclosure, applied to a target network side device, as shown in FIG. 3, the method includes:

Step 201: receiving a CHO request sent by a source network side device;

Step 202: sending a CHO cancellation message to the source network side device before a CHO occurs.

According to the embodiments of the present disclosure, after a source network side device sends a CHO request to at least one target network side device, the target network side device may, according to actual situations, initiate a CHO cancellation, so as to cancel a condition handover of a terminal side device.

Furthermore, the sending the CHO cancellation message to the source network side device includes:

sending the CHO cancellation message to the resource network side device in the case that a terminal side device does not perform a CHO to the target network side device within a preset time.

Furthermore, the CHO cancellation message includes at least one of:

information for identifying a CHO command;

a CHO cancellation reason.

Figure 4:
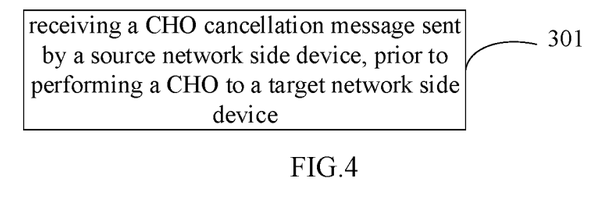
FIG. 4 is a flowchart of a CHO cancellation method applied to a terminal side device in an embodiment of the present disclosure.

A CHO cancellation method is provided in an embodiment of the present disclosure, applied to a terminal side device. As shown in FIG. 4, the CHO cancellation method includes:

Step 301: receiving a CHO cancellation message sent by a source network side device, prior to performing a CHO to a target network side device.

According to the embodiments of the present disclosure, after a source network side device sends a CHO request to at least one target network side device, the source network side device or the target network side device may, according to actual situations, initiate a CHO cancellation, so as to cancel a condition handover of a terminal side device.

Furthermore, subsequent to the receiving the CHO cancellation message sent by the source network side device, the method further includes:

stopping a CHO condition evaluation of the target network side device.

Furthermore, the CHO cancellation message includes at least one of:

information of a network side device that needs to cancel a CHO;

information for identifying a CHO command.

The CHO cancellation method of the present disclosure will be described in detail below in conjunction with specific embodiments:

Example One

In this embodiment, the network side device is a base station. After the source base station sends a CHO request to one or more target base stations, the source base station initiates a CHO cancellation.

In a specific example, after the source base station sends a CHO request to one or more target base stations, if the source base station does not receive a CHO response from the target base station, such as base station B, within a preset time, the source base station sends a CHO cancellation message to base station B, to request cancelling a CHO.

In another specific example, after the source base station sends a CHO request to one or more target base stations, if a CHO response returned by the target base station is received within a preset time, regardless of whether the source base station has sent a CHO command to the UE, the source base station decides to cancel a CHO of a target base station, such as base station C, or cancel a CHO of a cell of a target base station, such as a cell of base station C, the source base station may send a CHO cancellation message to the target base station, such as base station C, to request cancelling the CHO.

The reason why the source base station decides to cancel the CHO includes determining that the target base station or a certain cell of the target base station is not suitable to serve as the target of the CHO according to the measurement report reported by the UE.

If the source base station decides to cancel the CHO before the source base station sends the CHO command to the UE, the source base station only needs to send the CHO cancellation message to the target base station, and does not need to send the CHO cancellation message to the UE. The CHO cancellation message may carry the reason for canceling the CHO and which base stations or cells need to cancel the CHO.

If the source base station decides to cancel the CHO after the source base station sends the CHO command to the UE, the source base station not only needs to send a CHO cancellation message to the target base station, but also needs to send a CHO cancellation message to the UE. The CHO cancellation message sent to the target base station ay carry the reason for canceling the CHO and which base stations or cells need to cancel the CHO. The CHO cancellation message sent to the UE may carry which base stations or cells need to cancel CHO. After the UE receives the CHO cancellation message, the UE will stop performing the CHO condition evaluation of the target base station or cell that is to cancel the CHO, thereby prevent the UE from evaluating invalid target base stations or cells, thereby releasing processing resources of the UE.

Example Two

In this embodiment, the network side device is a base station. After the source base station sends a CHO request to one or more target base stations, the target base station initiates a CHO cancellation.

After the source base station sends a CHO request to one or more target base stations, if the UE does not perform a handover to the target base station within a preset time, the target base station may cancel the UE CHO to the target base station or a certain cell of the target base station.

When the target base station decides to cancel the CHO, the target base station sends a CHO cancellation message to the source base station. The CHO cancellation message may include information identifying the CHO command, such as the handover command identifier, and may also include the reason for canceling the CHO, such as a high load of a certain cell of the target base station.

After the source base station receives the CHO cancellation message of the target base station, the source base station sends a CHO cancel confirmation to the target base station to confirm the cancellation of the CHO, and since the UE has not yet performed a handover to the target base station, the source base station also needs to send a CHO cancellation message to the UE. The CHO cancellation message sent to the UE may carry which base stations or cells need to cancel the CHO, and may also carry information identifying the CHO command, such as the handover command identifier. After the UE receives the CHO cancellation message, the UE will stop performing the CHO condition evaluation of the target base station or cell that cancels the CHO, to prevent the UE from evaluating invalid target base stations or cells, thereby releasing the processing resources of the UE.

Example Three

In this embodiment, the network side device is a base station. After the source base station sends a CHO request to multiple target base stations, the source base station initiates a CHO cancellation. The CHO cancellation method of this embodiment specifically includes the following steps:

Step 1: After the source base station sends CHO requests to multiple target base stations, the source base station receives CHO responses returned by multiple target base stations;

Step 2: The source base station receives the UE CHO success message returned by one of the target base stations;

If the UE successfully performs a CHO to the cell of the target base station, the target base station feeds back a UE CHO success message to the source base station, indicating that the UE has successfully performed the CHO to the cell of the target base station. The CHO success message may also include the cell information that the UE successfully accessed and/or information about the target base station.

Step 3: The source base station sends a CHO cancellation message to other target base stations, to request cancelling the CHO.

The other target base stations are the target base stations other than the target base stations in step 2 of the multiple target base stations to which the source base station sends the CHO request, i.e., the other target base stations to which the UE has not performed the CHO successfully. The CHO cancellation message may include the reason for canceling the CHO, for example, the UE has successfully performed a handover to another target base station and/or cell.

Example Four

Figure 5:
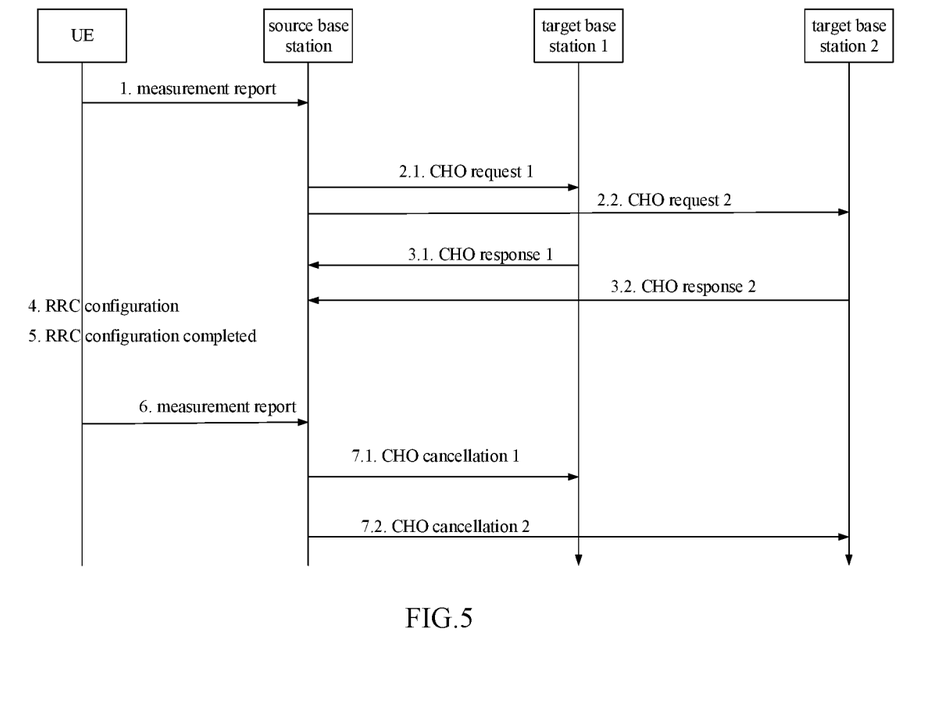
FIGS. 5 and 6 are structural block diagrams of network side devices in an embodiment of the present disclosure.

In this embodiment, the network side device is a base station. As shown in FIG. 5, after the source base station sends a CHO request to the target base station 1 and the target base station 2, the source base station initiates a CHO cancellation. The CHO cancellation method of this embodiment specifically includes the following steps:

Step 1: The UE reports a measurement report to the source base station;

Step 2: The source base station sends a CHO request message 1 to the target base station 1 noand sends a CHO request message 2 to the target base station 2;

Step 3: The target base station 1 returns a CHO response 1 to the source base station, and the target base station 2 returns a CHO response 2 to the source base station;

Step 4: The UE performs a radio resource control (Radio Resource Control, RRC) configuration, and the source base station configures one or more handover commands for the UE, one or more handover conditions for the UE.

Step 5: The RRC configuration of the UE is completed;

Step 6: The UE reports a measurement report to the source base station;

Step 7: The source base station sends a CHO cancellation message 1 to the target base station 1, and the source base station sends a CHO cancellation message 2 to the target base station 2;

The source base station determines that the target base station 1 and the target base station 2 are not suitable for the CHO target according to the measurement report reported by the UE, and decides to cancel the CHO. The source base station sends a CHO cancellation message 1 to the target base station 1, and the source base station sends a CHO cancellation message 2 to the target base station 2. The CHO cancellation message sent to the target base station may carry the reason for canceling the CHO and which base stations or cells need to cancel the CHO.

Step 8: The source base station sends a CHO cancellation message to the UE.

Since the source base station decides to cancel the CHO after the source base station issues the CHO command to the UE, a CHO cancellation message needs to be sent to the UE.

The CHO cancellation message sent to the UE may carry which base stations or cells need to cancel CHO. After the UE receives the CHO cancellation message, the UE will stop performing the CHO condition evaluation of the target base station or cell that cancels the CHO, to prevent the UE from evaluating invalid target base stations or cells, thereby releasing processing resources of the UE.

Figure 6:
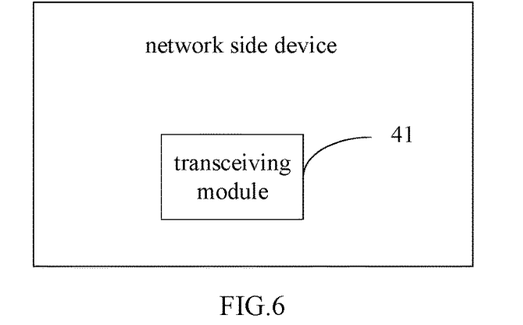

A network side device is further provided in an embodiment of the present disclosure, which may be a source network side device that initiates a CHO request, as shown in FIG. 6, the network side device includes:

a transceiving module 41, configured to send a CHO request to at least one target network side device and send a CHO cancellation message to the target network side device and/or a terminal side device.

According to the embodiments of the present disclosure, after a source network side device sends a CHO request to at least one target network side device, the source network side device may, according to actual situations, initiate a CHO cancellation, so as to cancel a condition handover of a terminal side device.

For example, the transceiving module is further configured to: send the CHO cancellation message to the target network side device in the case that a CHO response returned by the target network side device is not received within a preset time.

For example, the transceiving module is further configured to:

receive a CHO response returned by the target network side device;

send the CHO cancellation message to the target network side device, before a CHO command is not sent to the terminal side device;

send the CHO cancellation message to the target network side device and the terminal side device, in the case that the CHO command is sent to the terminal side device.

Furthermore, the network side device further includes:

a processing module, configured to determine that the target network side device does not satisfy a CHO condition, according to a measurement report reported by the terminal side device.

Furthermore, the CHO cancellation message sent to the target network side device includes at least one of:

a CHO cancellation reason;

information of a network side device that needs to cancel a CHO;

the CHO cancellation message sent to the terminal side device includes the information of the network side device that needs to cancel the CHO.

For example, the transceiving module 41 is further configured to:

receive a CHO response returned by a first target network side device;

receive a terminal side device CHO success message returned by a second target network side device, where the terminal side device CHO success message indicates that the terminal side device successfully performs a CHO to the second target network side device; and send the CHO cancellation message to the first target network side device, where the first target network side device and the second target network side device are different target network side devices.

Furthermore, the terminal side device CHO success message further includes at least one of:

information of a cell accessed by the terminal side device;

information of a network side device accessed by the terminal side device;

the CHO cancellation message includes a CHO cancellation reason.

For example, the transceiving module is further configured to: receive the CHO cancellation message sent by the target network side device.

Furthermore, the transceiving module 41 is further configured to: send the CHO cancellation message to the terminal side device.

Furthermore, the transceiving module 41 is further configured to: send a CHO cancellation confirmation to the target network side device.

Furthermore, the CHO cancellation message includes information for identifying a CHO command.

A network side device is further provided in an embodiment of the present disclosure, which may be a target network side device that receives a CHO request, as shown in FIG. 6, the network side device includes:

a transceiving module 41, configured to: receive a CHO request sent by a source network side device; and send a CHO cancellation message to the source network side device before a CHO occurs.

According to the embodiments of the present disclosure, after a source network side device sends a CHO request to at least one target network side device, the target network side device may, according to actual situations, initiate a CHO cancellation, so as to cancel a condition handover of a terminal side device.

Furthermore, the transceiving module 41 is further configured to: send the CHO cancellation message to the resource network side device in the case that a terminal side device does not perform a CHO to the target network side device within a preset time.

Furthermore, the CHO cancellation message includes at least one of:
information for identifying a CHO command;
a CHO cancellation reason.

Figure 7:
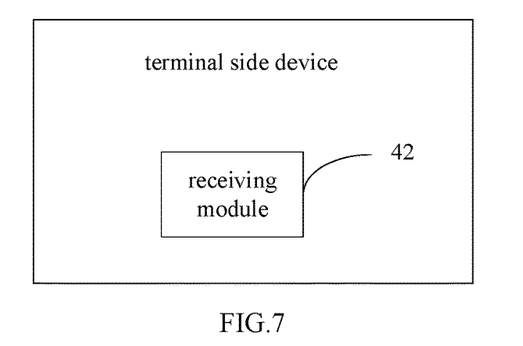
FIG. 7 is a structural block diagram of a terminal side device in an embodiment of the present disclosure.

A terminal side device is further provided in an embodiment of the present disclosure, as shown in FIG. 7, the terminal side device includes:
a receiving module 42, configured to: receive a CHO cancellation message sent by a source network side device, prior to performing a CHO to a target network side device.

According to the embodiments of the present disclosure, after a source network side device sends a CHO request to at least one target network side device, the source network side device or the target network side device may, according to actual situations, initiate a CHO cancellation, so as to cancel a condition handover of a terminal side device.

Furthermore, the terminal side device further includes:
a processing module, configured to: in the case that the CHO cancellation message sent by the source network side device is received, stop a CHO condition evaluation of the target network side device.

Furthermore, the CHO cancellation message includes at least one of:
information of a network side device that needs to cancel a CHO;
information for identifying a CHO command.

A communication device is further provided in an embodiment of the present disclosure, including: a memory, a processor and a computer program stored in the memory and executable on the processor, where the processor executes the computer program to perform the CHO cancellation method hereinabove.

The communication device may be a terminal side device, a source network side device that sends a CHO request, or a target network side device that receives the CHO request.

Figure 8:
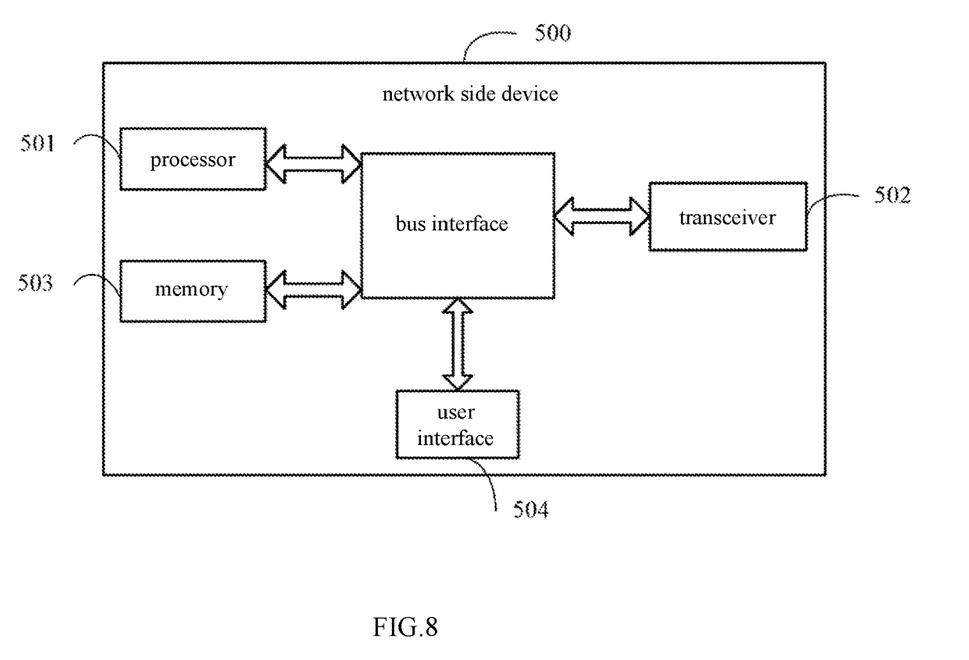
FIG. 8 is a schematic diagram of a network side device in an embodiment of the present disclosure.

Referring to FIG. 8 which is a structural diagram of a network side device in an embodiment of the present disclosure, which can implement the details of the condition handover cancellation method in the foregoing embodiment and achieve the same effect. As shown in FIG. 8, the network side device 500 includes: a processor 501, a transceiver 502, a memory 503, a user interface 504, and a bus interface.

In the embodiment of the present disclosure, the network side device 500 further includes: a computer program stored in the memory 503 and executable on the processor 501.

When the network side device is the source network side device, the processor 501 executes the computer program to:
send a CHO request to at least one target network side device; and
send a CHO cancellation message to the target network side device and/or a terminal side device;

In FIG. 8, the bus architecture may include any number of interconnected buses and bridges. Specifically, one or more processors represented by the processor 501 and various circuits of the memory represented by the memory 503 are linked together. The bus architecture can also link various other circuits such as peripherals, voltage regulators, power management circuits, etc., which are all known in the art, and therefore, no further description will be given herein. The bus interface provides the interface. The transceiver 502 may be a plurality of elements, that is, include a transmitter and a receiver, and provide a unit for communicating with various other devices on the transmission medium. For different UE, the user interface 504 may also be an interface capable of connecting externally and internally with the required equipment. The connected equipment includes but not limited to a keypad, a display, a speaker, a microphone, a joystick, and the like.

The processor 501 is responsible for managing the bus architecture and general processing, and the memory 503 can store data used by the processor 501 when performing operations.

Furthermore, the processor 501 is further configured to: send the CHO cancellation message to the target network side device in the case that a CHO response returned by the target network side device is not received within a preset time.

Furthermore, the processor 501 is further configured to:
receive a CHO response returned by the target network side device;
send the CHO cancellation message to the target network side device, before a CHO command is not sent to the terminal side device;
send the CHO cancellation message to the target network side device and the terminal side device, in the case that the CHO command is sent to the terminal side device.

Furthermore, the processor 501 is further configured to:
determine that the target network side device does not satisfy a CHO condition, according to a measurement report reported by the terminal side device.

Furthermore, the CHO cancellation message sent to the target network side device includes at least one of:
a CHO cancellation reason;
information of a network side device that needs to cancel a CHO;
the CHO cancellation message sent to the terminal side device includes the information of the network side device that needs to cancel the CHO.

Furthermore, the processor 501 is further configured to:
receive a CHO response returned by a first target network side device;
receive a terminal side device CHO success message returned by a second target network side device, where the terminal side device CHO success message indicates that the terminal side device successfully performs a CHO to the second target network side device; and
send the CHO cancellation message to the first target network side device, where the first target network side device and the second target network side device are different target network side devices.

Furthermore, the terminal side device CHO success message further includes at least one of:
information of a cell accessed by the terminal side device;
information of a network side device accessed by the terminal side device;
the CHO cancellation message includes a CHO cancellation reason.

Furthermore, the processor 501 is further configured to: receive the CHO cancellation message sent by the target network side device.

Furthermore, the processor 501 is further configured to: send the CHO cancellation message to the terminal side device.

Furthermore, the processor 501 is further configured to: send a CHO cancellation confirmation to the target network side device.

Furthermore, the CHO cancellation message includes information for identifying a CHO command.

Furthermore, when the network side device is the target network side device, the processor 501 executes the computer program to: receive a CHO request sent by a source network side device; and send a CHO cancellation message to the source network side device before a CHO occurs.

Furthermore, the processor 501 is further configured to send the CHO cancellation message to the resource network side device in the case that a terminal side device does not perform a CHO to the target network side device within a preset time.

The CHO cancellation message includes at least one of the following information:
information for identifying a CHO command;
a CHO cancellation reason.

A terminal side device is further provided in an embodiment of the present disclosure, including: a memory, a processor and a computer program stored in the memory and executable on the processor. The processor executes the computer program to perform the CHO cancellation method hereinabove.

Figure 9:
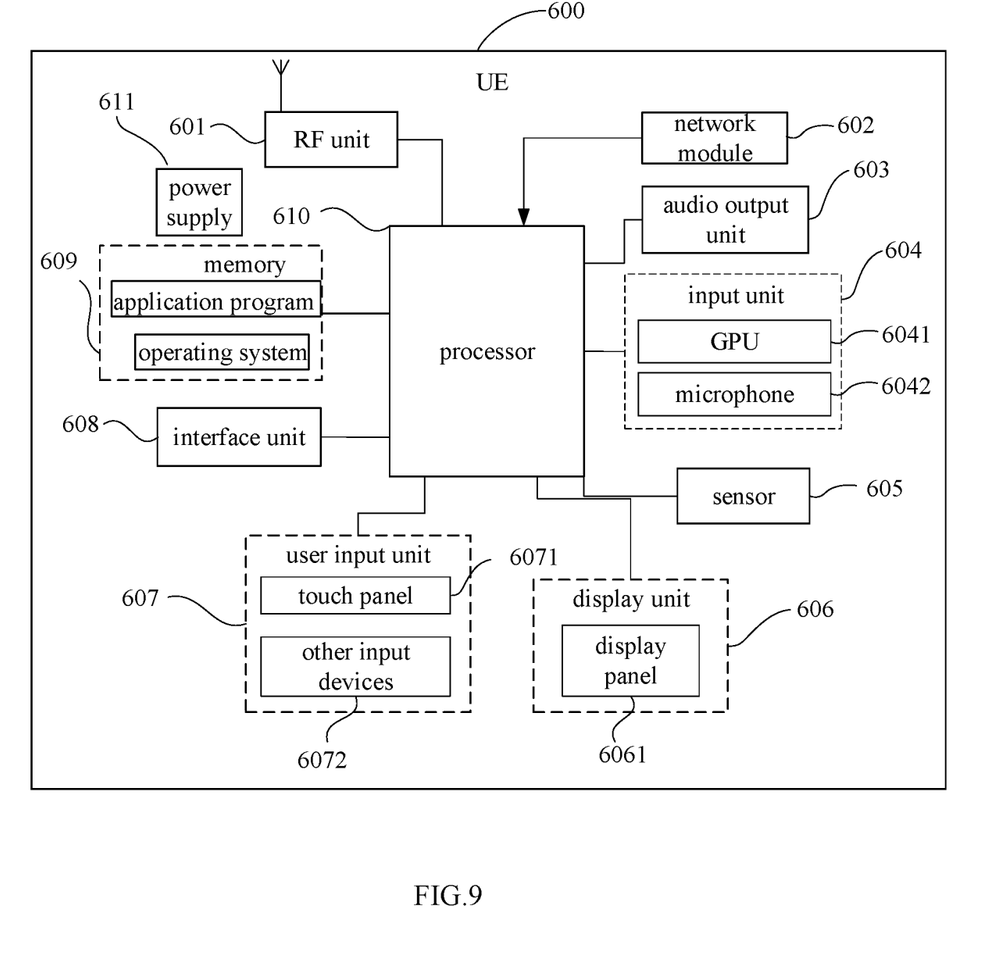
FIG. 9 is a schematic diagram of a terminal side device in an embodiment of the present disclosure.

FIG. 9 is a schematic diagram of the hardware structure of a terminal side device that implements various embodiments of the present disclosure. Referring to FIG. 9, the terminal side device 600 includes but is not limited to: a radio frequency unit 601, a network module 602, an audio output unit 603, an input unit 604, a sensor 605, a display unit 606, a user input unit 607, an interface unit 608, a memory 609, The processor 610, and the power supply 611 and other components. Those skilled in the art can understand that the terminal side device structure shown in FIG. 9 does not constitute a limitation on the terminal side device, and the terminal side device may include more or less components than shown in the figure, or combine certain components, or different component arrangements. In the embodiment of the present disclosure, terminal side devices include but are not limited to mobile phones, tablet computers, notebook computers, palmtop computers, vehicle-mounted terminals, wearable devices, and pedometers.

The processor 610 is configured to receive a CHO cancellation message sent by a source network side device, prior to performing a CHO to a target network side device.

Furthermore, the processor 610 is further configured to: in the case that the CHO cancellation message sent by the source network side device is received, stop a CHO condition evaluation of the target network side device.

Furthermore, the CHO cancellation message includes at least one of the following information:
information of a network side device that needs to cancel a CHO;
information for identifying a CHO command.

It should be understood that, in the embodiment of the present disclosure, the radio frequency unit 601 can be used for receiving and sending signals in the process of sending and receiving information or talking. Specifically, the downlink data from the base station is received and processed by the processor 610; Uplink data is sent to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with the network and other devices through a wireless communication system.

The terminal provides users with wireless broadband Internet access through the network module 602, such as helping users to send and receive emails, browse web pages, and access streaming media.

The audio output unit 603 can convert the audio data received by the radio frequency unit 601 or the network module 602 or stored in the memory 609 into audio signals and output them as sounds. Moreover, the audio output unit 603 may also provide audio output related to a specific function performed by the terminal 600 (for example, call signal reception sound, message reception sound, etc.). The audio output unit 603 includes a speaker, a buzzer, a receiver, and the like.

The input unit 604 is used to receive audio or video signals. The input unit 604 may include a graphics processing unit (Graphics Processing Unit, GPU) 6041 and a microphone 6042. The graphics processor 6041 is configured to monitor image data of still pictures or videos obtained by an image capture device (such as a camera) in a video capture mode or an image capture mode. To process. The processed image frame may be displayed on the display unit 606. The image frame processed by the graphics processor 6041 may be stored in the memory 609 (or other storage medium) or sent via the radio frequency unit 601 or the network module 602. The microphone 6042 can receive sound and can process such sound into audio data. The processed audio data can be converted into a format that can be sent to the mobile communication base station via the radio frequency unit 601 for output in the case of a telephone call mode.

The terminal 600 also includes at least one sensor 605, such as a light sensor, a motion sensor, and other sensors. Specifically, the light sensor includes an ambient light sensor and a proximity sensor. The ambient light sensor can adjust the brightness of the display panel 6061 according to the brightness of the ambient light. The proximity sensor can close the display panel 6061 and/or backlight when the terminal 600 is moved to the ear. As a kind of motion sensor, the accelerometer sensor can detect the magnitude of acceleration in various directions (usually three-axis), and can detect the magnitude and direction of gravity when stationary, and can be used to identify terminal posture (such as horizontal and vertical screen switching, related games, Magnetometer attitude calibration), vibration recognition related functions (such as pedometer, percussion), etc.; sensor 605 can also include fingerprint sensors, pressure sensors, iris sensors, molecular sensors, gyroscopes, barometers, hygrometers, thermometers, infrared Sensors, etc., will not be repeated here.

The display unit 606 is used to display information input by the user or information provided to the user. The display unit 606 may include a display panel 6061, and the display panel 6061 may be configured in the form of liquid crystal display (Liquid Crystal Display, LCD), organic light-emitting Diode (Organic Light-Emitting Diode, OLED), etc.

The user input unit 607 can be used to receive inputted number or character information, and generate key signal input related to user settings and function control of the terminal. Specifically, the user input unit 607 includes a touch panel 6071 and other input devices 6072. The touch panel 6071, also called a touch screen, can collect the user's touch operations on or near it (for example, the user uses any suitable objects or accessories such as fingers, stylus, etc.) on the touch panel 6071 or near the touch panel 6071. The touch panel 6071 may include two parts: a touch detection device and a touch controller. Touch detection device detects the user's touch position, and detects the signal brought by the touch operation, and transmits the signal to the touch controller; the touch controller receives the touch information from the touch detection device, converts it into contact coordinates, and then sends it To the processor 610, the command sent by the processor 610 is received and executed. In addition, the touch panel 6071 can be implemented in multiple types such as resistive, capacitive, infrared, and surface acoustic wave. In addition to the touch panel 6071, the user input unit 607 may also include other input devices 6072. Specifically, other input devices 6072 may include, but are not limited to, a physical keyboard, function keys (such as volume control buttons, switch buttons, etc.), trackball, mouse, and joystick, which will not be repeated here.

Further, the touch panel 6071 can cover the display panel 6061. When the touch panel 6071 detects a touch operation on or near it, it transmits it to the processor 610 to determine the type of the touch event, and then the processor 610 responds to the touch type of event provides corresponding visual output on the display panel 6061. Although in FIG. 9, the touch panel 6071 and the display panel 6061 are used as two independent components to realize the input and output functions of the terminal, in some embodiments, the touch panel 6071 and the display panel 6061 can be integrated, to realize the input and output functions of the terminal, which are not limited here.

The interface unit 608 is an interface for connecting an external device to the terminal 600. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 608 can be used to receive input (for example, data information, power, etc.) from an external device and transmit the received input to one or more elements in the terminal 600 or can be used to communicate between the terminal 600 and the external device. Transfer data between.

The memory 609 can be used to store software programs and various data. The memory 609 may mainly include a program storage area and a data storage area. The program storage area may store an operating system, an application program required by at least one function (such as a sound playback function, an image playback function, etc.), etc.; the data storage area stores data (such as audio data, phone book, etc.) created by the use of mobile phones. In addition, the memory 609 may include a high-speed random access memory, and may also include a non-volatile memory, such as at least one magnetic disk storage device, a flash memory device, or other volatile solid-state storage devices.

The processor 610 is the control center of the terminal. It uses various interfaces and lines to connect various parts of the entire terminal. It executes by running or executing software programs and/or modules stored in the memory 609, and calling data stored in the memory 609. Various functions of the terminal and processing data, so as to monitor the terminal as a whole. The processor 610 may include one or more processing units; preferably, the processor 610 may integrate an application processor and a modem processor, where the application processor mainly processes the operating system, user interface, application programs, etc., and the modem processor mainly deals with wireless communication. It can be understood that the foregoing modem processor may not be integrated into the processor 610.

The terminal 600 may also include a power supply 611 (such as a battery) for supplying power to various components. Preferably, the power supply 611 may be logically connected to the processor 610 through a power management system, so as to manage charging, discharging, and power consumption management through the power management system. Features.

In addition, the terminal 600 includes some functional modules not shown, which will not be repeated here.

A computer-readable storage medium is further provided in an embodiment of the present disclosure, where a computer program is stored in the computer-readable storage medium, and a processor executes the computer program to perform the CHO cancellation method hereinabove.

It can be understood that the embodiments described herein can be implemented by hardware, software, firmware, middleware, microcode, or a combination thereof. For hardware implementation, the processing unit can be implemented in one or more application specific integrated circuits (Application Specific Integrated Circuits, ASIC), digital signal processor (Digital Signal Processing, DSP), DSPD (DSP Device), programmable logic device (Programmable Logic Device, PLD), field-programmable gate array (Field-Programmable Gate Array, FPGA), general-purpose processors, controllers, microcontrollers, microprocessors, and other electronics used to perform the functions described in this application Unit or its combination.

For software implementation, the technology described herein can be implemented by modules (such as procedures, functions, etc.) that perform the functions described herein. The software codes can be stored in the memory and executed by the processor. The memory can be implemented in the processor or external to the processor.

The embodiments in this specification are described in a progressive manner, and each embodiment focuses on the differences from other embodiments, and the same or similar parts between the various embodiments can be referred to each other.

Those skilled in the art should understand that the embodiments of the embodiments of the present disclosure may be provided as methods, devices, or computer program products. Therefore, the embodiments of the present disclosure may adopt the form of a complete hardware embodiment, a complete software embodiment, or an embodiment combining software and hardware. Moreover, the embodiments of the present disclosure may adopt the form of a computer program product implemented on one or more computer-usable storage media (including but not limited to disk storage, CD-ROM, optical storage, etc.) containing computer-usable program codes.

The embodiments of the present disclosure are described with reference to flowcharts and/or block diagrams of methods, terminal side devices (systems), and computer program products according to the embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processors of general-purpose computers, special computers, embedded processors, or other programmable data processing terminal side equipment to generate a machine, which can be executed by the processor of the computer or other programmable data processing terminal side equipment The instructions generate means for realizing the functions specified in one process or multiple processes in the flowchart and/or one block or multiple blocks in the block diagram.

These computer program instructions can also be stored in a computer-readable memory that can guide a computer or other programmable data processing terminal side equipment to work in a specific manner, so that the instructions stored in the computer-readable memory produce an article of manufacture including the instruction device, The instruction device realizes the functions specified in one process or multiple processes in the flowchart and/or one block or multiple blocks in the block diagram.

These computer program instructions can also be loaded on a computer or other programmable data processing terminal side equipment, so that a series of operation steps are executed on the computer or other programmable terminal side equipment to generate computer-implemented processing, so that the computer or other programmable data processing The instructions executed on the terminal side device provide steps for implementing functions specified in one process or multiple processes in the flowchart and/or one block or multiple blocks in the block diagram.

Although the preferred embodiments of the embodiments of the present disclosure have been described, those skilled in the art can make additional changes and modifications to these embodiments once they learn the basic creative concept. Therefore, the appended claims are intended to be interpreted as including the preferred embodiments and all changes and modifications falling within the scope of the embodiments of the present disclosure.

It should also be noted that in this article, relational terms such as first and second are only used to distinguish one entity or operation from another entity or operation, and do not necessarily require or imply these entities or operations. There is any such actual relationship or order between. Moreover, the terms "include", "including" or any other variants thereof are intended to cover non-exclusive inclusion, so that a process, method, article, or terminal side device that includes a series of elements includes not only those elements, but also includes the other elements listed may also include elements inherent to such processes, methods, articles, or terminal side equipment. If there are no more restrictions, the element defined by the sentence "including a . . . " does not exclude the existence of other same elements in the process, method, article, or terminal side device that includes the element.

The above are some embodiments of the present disclosure. It should be noted that for those of ordinary skill in the art, a number of improvements and modifications can be made without departing from the principles of the present disclosure, and these improvements and modifications are also included in the scope of the present disclosure.

What is claimed is:

1. A Condition Handover (CHO) cancellation method, applied to a source network side device, comprising:
    sending a CHO request to at least one target network side device; and
    sending a CHO cancellation message to the target network side device and/or a terminal side device;
    wherein the sending the CHO cancellation message to the target network side device comprises:
    receiving a CHO response returned by the target network side device;
    sending the CHO cancellation message to the target network side device, before a CHO command is sent to the terminal side device.

2. The CHO cancellation method according to claim 1, wherein the sending the CHO cancellation message to the target network side device and the terminal side device further comprises:
    receiving a CHO response returned by the target network side device;
    sending the CHO cancellation message to the target network side device and the terminal side device, in the case that the CHO command is sent to the terminal side device.

3. The CHO cancellation method according to claim 2, wherein prior to the sending the CHO cancellation message, the method further comprises:
    determining that the target network side device does not satisfy a CHO condition, according to a measurement report reported by the terminal side device.

4. The CHO cancellation method according to claim 2, wherein the CHO cancellation message sent to the target network side device comprises at least one of:
    a CHO cancellation reason;
    information of a network side device that needs to cancel a CHO;
    the CHO cancellation message sent to the terminal side device comprises the information of the network side device that needs to cancel the CHO.

5. The CHO cancellation method according to claim 1, wherein the sending the CHO cancellation message to the target network side device and/or the terminal side device comprises:
    receiving a CHO response returned by a first target network side device;
    receiving a terminal side device CHO success message returned by a second target network side device, wherein the terminal side device CHO success message indicates that the terminal side device successfully performs a CHO to the second target network side device; and
    sending the CHO cancellation message to the first target network side device, wherein the first target network side device and the second target network side device are different target network side devices.

6. The CHO cancellation method according to claim 5, wherein the terminal side device CHO success message further comprises at least one of:
    information of a cell accessed by the terminal side device;
    information of a network side device accessed by the terminal side device;
    the CHO cancellation message comprises a CHO cancellation reason.

7. The CHO cancellation method according to claim 1, wherein prior to the sending the CHO cancellation message to the terminal side device, the method further comprises:
    receiving a CHO cancellation message sent by the target network side device;
    wherein the sending the CHO cancellation message to the terminal side device comprises:
    sending the CHO cancellation message to the terminal side device.

8. The CHO cancellation method according to claim 7, further comprising:
    sending a CHO cancellation confirmation to the target network side device.

9. The CHO cancellation method according to claim 1, wherein the CHO cancellation message comprises information for identifying a CHO command.

10. A Condition Handover (CHO) cancellation method, applied to a target network side device, comprising:
    receiving a CHO request sent by a source network side device; and
    sending a CHO cancellation message to the source network side device before a CHO occurs;
    wherein the sending the CHO cancellation message to the source network side device comprises:
    sending the CHO cancellation message to the source network side device in the case that a terminal side device does not perform a CHO to the target network side device within a preset time.

11. The CHO cancellation method according to claim 10, wherein the CHO cancellation message comprises at least one of:

information for identifying a CHO command;

a CHO cancellation reason.

12. A network side device, comprising: a memory, a processor and a computer program stored in the memory and executable on the processor, wherein the processor executes the computer program to perform the CHO cancellation method according to claim 1.

13. A network side device, comprising: a memory, a processor and a computer program stored in the memory and executable on the processor, wherein the processor executes the computer program to perform the CHO cancellation method according to claim 10.

* * * * *